United States Patent [19]

Bossard et al.

[11] Patent Number: 5,668,610
[45] Date of Patent: Sep. 16, 1997

[54] LMDS TRANSMITTER ARRAY WITH POLARIZATION-DIVERSITY SUB-CELLS

[75] Inventors: Bernard Bossard, New York; David R. Treacy, Pelham, both of N.Y.

[73] Assignee: Cellularvision Technology & Telecommunications, L.P., Freehold, N.J.

[21] Appl. No.: 566,780

[22] Filed: Dec. 4, 1995

[51] Int. Cl.$^6$ ........................................ H04H 3/00
[52] U.S. Cl. ........................ 348/723; 455/500; 455/422
[58] Field of Search .................. 348/21, 723; 455/33.4, 455/33.1, 37.3, 34.1; 379/59, 60; 343/742, 893, 756

[56] References Cited

U.S. PATENT DOCUMENTS

| | | | |
|---|---|---|---|
| 4,747,160 | 5/1988 | Bossard | 455/33.1 |
| 5,444,762 | 8/1995 | Foey et al. | 379/58 |
| 5,475,864 | 12/1995 | Hamabe | 455/33.1 |

FOREIGN PATENT DOCUMENTS

| | | | |
|---|---|---|---|
| 0429200 | 5/1991 | European Pat. Off. | H04H 3/00 |
| 9525409 | 4/1995 | WIPO | H04R 7/36 |

*Primary Examiner*—John K. Peng
*Assistant Examiner*—Nathan J. Flynn
*Attorney, Agent, or Firm*—David R. Treacy

[57] ABSTRACT

A low power, multi-function cellular television system for transmitting signals at super high frequencies. Each cell transmitter radiates signals with one polarization over one sector, and signals with a different polarization over the balance of 360°. Sectors of adjoining cells are aligned to minimize interference from the adjoining cell. Adjoining cells may transmit different pluralities of carrier frequencies which are interleaved to minimize interference further, with each cell having one set of transmitted frequencies radiated for both polarizations, occupying at least 90% of a band used in common for the system.

14 Claims, 5 Drawing Sheets

LMDS TRANSMITTER ARRAY WITH POLARIZATION-DIVERSITY SUB-CELLS

BACKGROUND OF THE INVENTION

This application claims benefit of U.S. Provisional Application No. 60/006020 filed Oct. 23, 1995.

1. Field of the Invention

The invention relates to a low power, point to multi-point, multi-function cellular television systems; and more particularly, to such systems transmitting at super high frequencies.

2. Description of the Prior Art

The localized microwave distribution system described in U.S. Pat. No. 4,747,160 includes a plurality of transmitter stations operating at low power in a corresponding plurality of cells. Each transmitter station has a substantially omnidirectional transmitting antenna. Each subscriber receiving station has a respective directional receiving antenna, directed so as to receive television signals from only one of the transmitting antennas.

In this prior art system, all of each cell receives signals from the cell transmitter at the same frequency or plurality of frequencies, and the same polarization. When the cells are arranged with the centers of each cell in a rectangular grid pattern, the antenna of a subscriber located close to one of the grid lines faces both its own cell transmitter and also the transmitter of the adjoining cell in the direction the subscriber's antenna is facing. Therefore this subscriber's antenna can receive a weak interfering signal from the more distant transmitter. However, according to the '160 patent, the signal from the adjoining cell's transmitter is polarized oppositely to the transmitter of the subscriber's own cell, such as vertically instead of horizontally. This provides a great improvement in the discrimination against the signal from the remote transmitter, so that ghost signals are not a problem. However, whenever terrain or other considerations prevent use of an approximately rectangular grid pattern, the advantages of this arrangement are reduced.

Another approach to distribution of telecommunications signals is exemplified by the Xerox Telecommunications network (XTEN), described in a document filed with the FCC. FIG. 7 of that proposal shows that signals are radiated in each cell over four sector antennae, each covering one quarter of the cell, and each sector radiating at all different frequency. The transmitting arrangements are disposed in straight columns, with adjacent columns aligned such that a transmitting arrangement in one column is equally spaced from two adjoining transmitting arrangements of the next column. All transmitting arrangements in a column radiate one polarization in the two quadrants to one side, and the other polarization to the other side. A pattern of polarization selection is so arranged that a subscriber is protected from interference by an adjoining transmitting arrangement in the next column by frequency diversity; and from interference by transmitters in the second column to one side by polarization diversity. This system suffers the disadvantage that each subscriber has access to only one quarter of the frequency spectrum used by the system.

SUMMARY OF THE INVENTION

An object of the invention is to provide a local multipoint distribution system which allows each subscriber access to substantially the entire band allocated for transmission, while minimizing interference by a transmitter in an adjoining cell.

Another object of the invention is to enable subscribers having receiving antennae with only moderate directionality to discriminate between signals from transmitting arrangements of their assigned cell and signals from an adjoining cell based on radiated signal polarization.

A cellular transmitting station according to the invention, especially useful for microwave frequencies above 12 Ghz. is characterized by radiating signals which are at a plurality of frequencies in a first frequency band and which are uniformly polarized over a first sector covering a portion of a full circle about a symmetry axis from the transmitting station; and signals which are at said first plurality of frequencies and which are uniformly polarized with a different polarization over a second sector covering the balance of the full circle about the symmetry axis, the two sectors together providing substantially omnidirectional coverage of the cell.

This cellular transmitting arrangement, which utilizes two sector antennae having different polarizations, makes it relatively easy to provide very even omnidirectional signal strength in the horizontal plane from an antenna arrangement which need not be at the top of a mast, while having an asymmetric pattern in a vertical plane such that little power is radiated at wastefully high angles above the horizontal, and at the same time radiating sufficient power below the horizontal so that nearby subscribers in lower buildings receive strong signals. For simplicity of language, as used hereinafter in the specification and claims, the term transmitter means this arrangement including the antennae, although it is only the antenna portions whose location and alignments are critical to the invention.

The two sectors are preferably equal, each covering approximately 180° plus a little overlap, so that a receiver on the division line between the two sectors can receive either polarization signal with a reduced signal strength compared with the major part of the sector. Using a well-known 180° sector antenna, the signal strength at the division line is reduced approximately 3 db. In a preferred embodiment, radiation above the horizontal is limited typically to no more than approximately 5°.

If each subscriber antenna has a relatively narrow beam reception angle, such as 5°, then, after allowing for small inaccuracies of alignment of the subscriber's antenna, perhaps as many as one fifth of the subscribers antennae have an adjoining cell transmitter within the antenna's beam angle. Therefore, where at least some subscribers receive attenuated signals from their own cell transmitter, because of reflections and shadows, improvement of the discrimination against the adjoining cell's signal will benefit a significant number of people.

A system for transmitting wide-band signals, such as television and/or data signals, to a multiplicity of customers dispersed over a large area, includes a plurality of transmitters as described above, placed at approximately equally spaced locations in a cellular array which is arranged to provide good reception for substantially all the area. The array is advantageously based on a plurality of approximately linearly arranged series of transmitters, the lines defining each of the series being parallel to each other, so that angular relationships of the symmetry or division lines of each of the transmitters can be defined without conflict or a great deal of experimentation It will be clear that uneven topography, natural or man-made obstacles, or refusal of authorities or property owners to allow use of some sites may require significant deviation from the regular patterns to be described below, but the principles of the invention can still be utilized to provide full cellular coverage with efficient use of spectrum and low capital investment.

In a first preferred arrangement, which provides a densely packed array, first, second and third series of transmitters are arranged in respective approximately straight lines parallel to each other, the arrangements in a respective line being approximately equally spaced from each other, with the symmetry axes for signal radiation in a given polarization being generally parallel to the straight line. Adjoining transmitting arrangements in a first of those series transmit signals toward each other having a same polarization, so that all subscribers of a first group, located near the symmetry lines of the first series, having respective receiving antennae oriented toward the respective nearest transmitters, receive respective signals from that nearest arrangement of a polarization different from that of signals from the next transmitter in that series.

In this preferred arrangement, the transmitters of the second series are adjacent the first series, but are displaced from lateral alignment sufficiently that a line from a transmitter of the first series to the nearest transmitter of the second series is inclined with respect to the respective division lines between the two directions of polarization by an angle greater than half the beam angle of the subscriber antennae; and desirably greater than approximately the full beam angle. The transmitters of the third series are adjacent the second series, to the opposite side from the first series, and are again displaced from lateral alignment sufficiently that a line from a transmitter of the third series to the nearest transmitter of the second series is inclined with respect to the respective division lines between the two directions of polarization by an angle greater than half the beam angle of the subscriber antennae; and desirably greater than approximately the full beam angle.

In the preferred arrangement, customers who are located near the symmetry line (and whose antennae are aimed toward both the nearest and the next transmitter) are protected from interference by the next transmitter because of polarization diversity. Customers who are located near a division line are protected from interference by transmitters in the adjoining series because those transmitters are outside the beam angle of the respective receiving antenna; and half of these customers are further protected by a difference in polarization. The only customers who experience interference from transmitters of the adjoining series are those whose antenna beam includes both the nearby transmitter antenna and that in the next series; and half of these further have polarization diversity.

If the transmitted signals are frequency modulated, the difference in distance, coupled with the polarization diversity, enable the receiving sets to provide demodulated signals having a high signal-to-noise ratio despite the effect of reflections. These reflections are a cause of multi-path distortion in the received signals, but also enable reception in what otherwise would be "radio shadows" caused by large buildings or other obstacles to line-of-sight transmission.

In a second preferred embodiment, the transmitting antennae are arranged in the same arrays of linear series, with polarization diversity, described above. To provide additional discrimination against signals from an adjoining cell, alternate transmitters in each series transmit at a first plurality of carrier frequencies in the band; and the other transmitters transmit at a second plurality of carrier frequencies in the band, interleaved between the first plurality of frequencies. Each individual transmitter uses its respective set of frequencies for transmissions in all directions, so that one transmitter and one set of modulators suffices, and only a polarization splitter alters the transmission from the two sector antennae. The adjoining series of transmitters have their carrier frequency pluralities selected such that a pair of adjoining transmitters, one from each series, having same polarizations radiated in a same azimuth direction, transmit at the different pluralities of carrier frequencies; and a pair of adjoining transmitters, one from each series, having opposite polarizations radiated in a same azimuth direction, transmit at the same pluralities of carrier frequencies With this second embodiment of transmitters, no subscriber can receive a nearby directly transmitted signal from the nearest transmitter, and a farther directly transmitted signal from a transmitter adjoining the nearest one, without at least diversity of polarization or carrier frequencies between the two received signals.

In the first and second preferred embodiments, the lateral staggering of densely packed transmitters minimizes the distance from any subscriber to the nearest transmitter. However, in some circumstances it may be preferable to have transmitters disposed approximately in a rectangular array of rows and columns. In this circumstance, if oriented as described above, the division lines of the radiation from one transmitter will pass near two adjoining transmitters if the polarization symmetry lines are parallel to the column or row .(series of transmitters in an approximately straight line).

In a third preferred embodiment, alternate transmitters in a first series disposed in an approximately straight line have their sector division lines inclined to one side of the straight line by an angle at least equal to half the beam angle of the subscriber antennae, but less than 45°; and desirably greater than approximately the full beam angle. The other transmitters of that series have their sector division lines inclined to the other side of the straight line by an angle at least equal to half the beam angle of the subscriber antennae, but less than 45°; and desirably greater than approximately the full beam angle. All the transmitters of a series radiate the same polarization to the same side.

With this form of array, a subscriber located near the straight line through the series, whose antenna receives signals from the near transmitter arrangement and the next transmitter, is protected from interference by polarization diversity of these signals. A subscriber located close to the division line between the two polarizations radiated by the near transmitter can be set for the one providing the best near signal, because the next transmitter is off to one side of the receiving antenna's acceptance pattern. Transmitters in a second, adjoining series, aligned approximately transversely to the transmitting antennae of the first series, likewise have their sector division lines inclined to the approximately straight line defining the second series, and radiate a same polarization to the same side. A pair of transmitters adjoining each other laterally, in different series, radiate a same polarization toward each other. Therefore a subscriber to one side of the division line, in one series, is protected from interference by the series just beyond the nearest transmitter, by polarization diversity. Subscribers located near a division line are protected because the nearest interfering transmitter is quite far away. Preferably, the symmetry lines of two laterally adjacent transmitters are inclined in the same direction, because this will allow minimizing interference between arrangements in adjoining series, but spaced apart twice the individual separation distance along the respective straight lines. It is a convenient simplification when designing and installing the system that the inclinations of the division lines be all the same value, so that all division lines inclined to one side are approximately parallel; however, this is not necessary.

Where it is not feasible to install node transmitters in an approximately straight line, the benefit of inclination is best obtained when the inclination causes a division line, from the border of a cell to its node, to be inclined by at least the receiving antenna half angle, or preferably full angle, from a line from that node to the next node in that general direction. In this special embodiment, according to a further aspect of the invention applicable when it is economical to provide sector antennae whose patterns have unequal beam angles, one greater than 180° by a selected number of degrees and the other less than 180° by the same amount, to minimize interference by selecting the sector angles so that the division lines do not point toward a neighboring node.

Similarly to the second embodiment, in a fourth embodiment, alternating transmitters in a series can use a same plurality of carrier frequencies in a band, while the other transmitters of that series use the other, interleaved plurality of carrier frequencies. Successive nodes in a line radiate a given polarization to alternating sides, while two nodes whose sectors point toward each other radiate different polarizations. In this embodiment, the interfering signal radiated directly from an adjoining node to a subscriber antenna always has a different carrier frequency, or different polarization, from the signal received from the subscriber's own node.

Other array patterns will provide specific protection against interference from particular directions, so that in a practical situation, where transmitter sites often cannot be optimized, a combination of these and other patterns, using transmitters having polarization diversity sectors, can be an economic solution to the problem of improving subscribers' reception.

DESCRIPTION OF THE PREFERRED EMBODIMENTS

Figure 1:
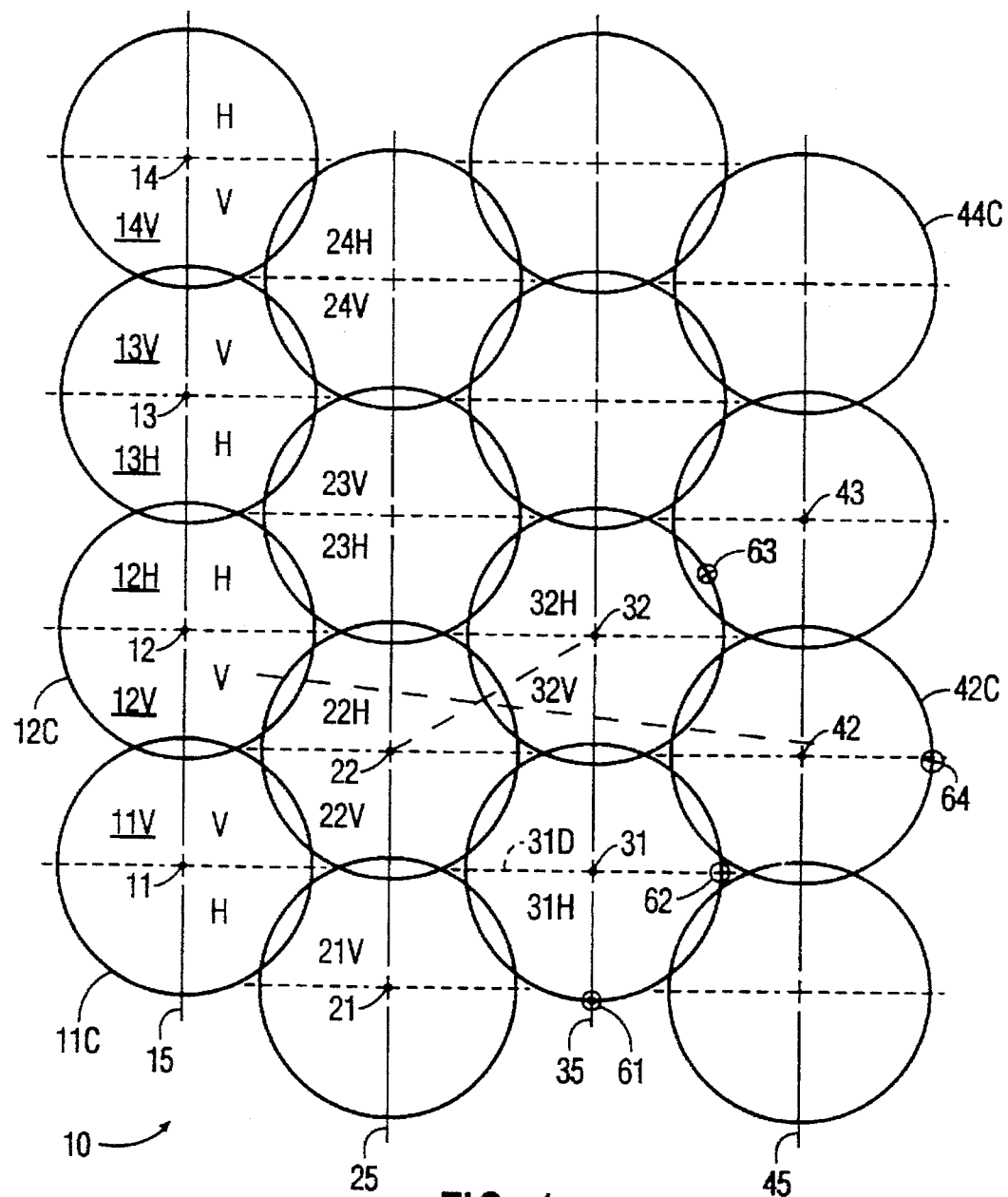
FIG. 1 is a plan view of an LMDS cellular array having a densely packed grid pattern.

The cellular system shown in FIG. 1 is formed by a cellular array 10 formed by transmitters at nodes 11–14, 21–24, 31–34 and 41–44 arranged in lines 15, 25, 35 and 45. The antenna system of each transmitter radiates signals which have one polarization over a sector approximately 180° wide symmetrically about a symmetry axis which is parallel to the line 15–45 along which the transmitter is placed, and a different polarization over another sector approximately 180° wide in the opposite direction, so that the two sectors provide substantially uniform coverage over a complete cell.

Adjoining nodes along line 15 transmit identical polarization toward each other, so that, where polarization is preferably vertical and horizontal, over sectors 11V and 13V nodes 11 and 13 radiate a vertically polarized signal toward nodes 12 and 14; over sectors 12V and 15V nodes 12 and 14 radiate a vertically polarized signal toward nodes 11 and 13; and over sectors 12H and 13H nodes 12 and 13 radiate a horizontally polarized signal toward each other. Similarly, nodes 21–24 along adjoining line 25 radiate polarized signals, with sector pairs 21V and 22V, 22H and 23H, 23V and 24V facing each other radiating vertically, horizontally and vertically polarized signals respectively. The sector alignments of nodes 31–34 are the same as nodes 11–14, and those of nodes 41–44 are the same as nodes 21–24.

In this embodiment, a subscriber 61 located near the border of cell 31C and symmetry line 35 at the side of the cell remote from node 32, receives an acceptably strong horizontally polarized signal from the transmitter at node 31, and a weak vertically polarized signal from node 32, so that the subscriber's antenna and receiver can readily achieve a high degree of discrimination against the interfering signal.

Further, a subscriber 62, located near the border of cell 31C along a division line 31D between the two sectors, whose receiving antenna has a beam width or capture angle of approximately 5° is more than four times the cell radius from node 11, which is the nearest other node within the antenna's capture angle. Therefore, even though the signal radiated along the division line is typically approximately 3 db less than that radiated over most of the sector, the signal from the remote node 11 is attenuated 12 db in comparison with that from the node 31 transmitter.

The relative location having the least discrimination between near transmitted signal and a remote transmitted signal is exemplified by a subscriber at location 63, on the border of cell 32 facing node 22, along a line through nodes 22 and 32. Although this location is closer to node 43 than node 32, for purposes of analysis it is presumed that shadowing causes the node 32 signal to be stronger or more reliable. This subscriber receives a horizontally polarized signal from both of these node transmitters. As shown in FIG. 1, the node 22 is slightly less than 3 cell radii from subscriber 63, so that the signal from node 22 is approximately 9 db weaker than that from node 32.

The advantage gained from an antenna beamwidth of approximately 5° is shown by location 64, which is close to the division line in cell 42. Except for node 22, the nearest other node is approximately 7° from the line between the location 64 and node 42. In each cell, two sector portions about 5° wide can experience the interference described for location 63; the other two comparable diagonals have a different polarization between the local node and the adjoining node. Thus this modest level of potential interference can affect approximately 3% of subscribers.

At some sacrifice in system complexity, because transmitters and receivers would not be fully identical, the location 63 type of interference can be greatly reduced by a second embodiment of a system according to the invention. In addition to the polarization diversity described with respect to FIG. 1, adjoining cells along lines such as the lines 15, 25, 35 and 45 transmit with interleaved carrier frequencies. The set of channels transmitted by one transmitter, including any guard bands, occupy at least 90%, and preferably at least approximately 98%, of the band. For example, a 1 Ghz band is divided into 50 upper channels which, including guard bands between adjoining channels, occupy approximately 991 Mhz, leaving the lowest approximately 9 MHz unused; and is further divided into 50 lower channels which, including guard bands between adjoining channels, occupy 991 MHz leaving the highest approximately 9 MHz unused.

Figure 2:
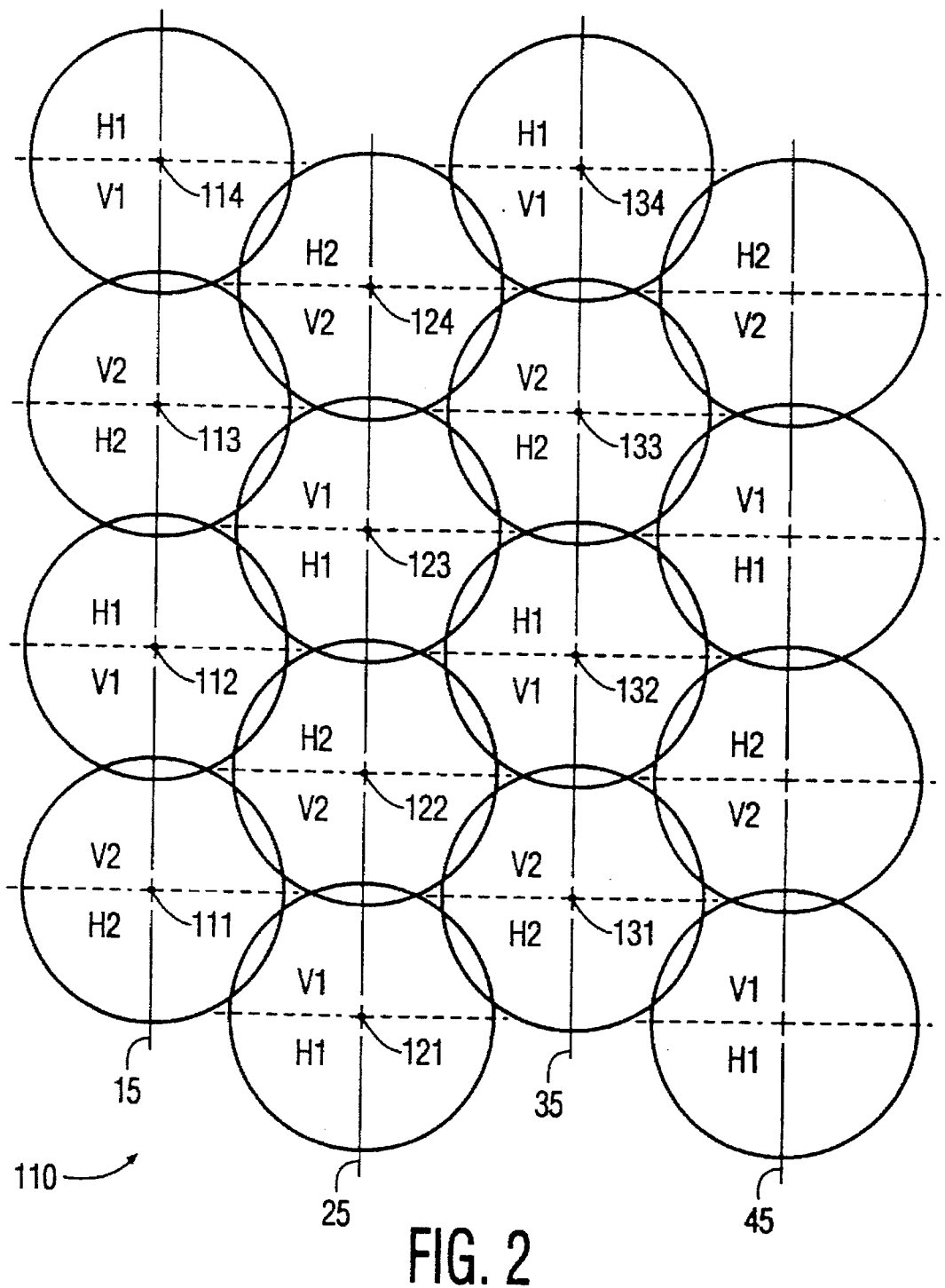
FIG. 2 is a plan view of an LMDS as in FIG. 1, also having interleaved frequency diversity.

As shown in FIG. 2, nodes 111, 113, 131 and 133 transmit vertically polarized signals in a first direction, upward as shown in the figure, using the upper channels as shown by the reference V2; and transmit horizontally polarized signals in the opposite or second direction using the same upper channels as shown by the reference H2. The other nodes in these two lines transmit using the lower channels, as shown by the references H1 and V1. The nodes of the other two lines such as 121 and 123, which transmit vertically polarized signals in the first direction use the lower channels as shown by the reference V1, and those which transmit vertically polarized signals in the second direction use the upper channels as shown by the reference V2. Again, the two sectors of a cell are transmitted at identical frequencies.

In this embodiment, a subscriber whose antenna receives significant signals from the local cell and an adjoining cell has at least a difference in polarization or a difference in carrier frequency, as well as a difference in distance, so that discrimination against the interfering signal is very high.

As can be seen by FIGS. 1 and 2, the "densely packed" pattern has only small areas falling within two cells, and very small areas which are not with one of the cells. Because of the usual unevenness of signal propagation due to obstacles, reflections, etc., a subscriber in these areas can almost always receive reliable signals from one of the three cells surrounding the between-cell zone; the distance from the nearest nodes is much less than those from which interference is described with respect to FIG. 1. It is, however, often expensive or impossible to align nodes in the densely packed pattern.

Figure 3:
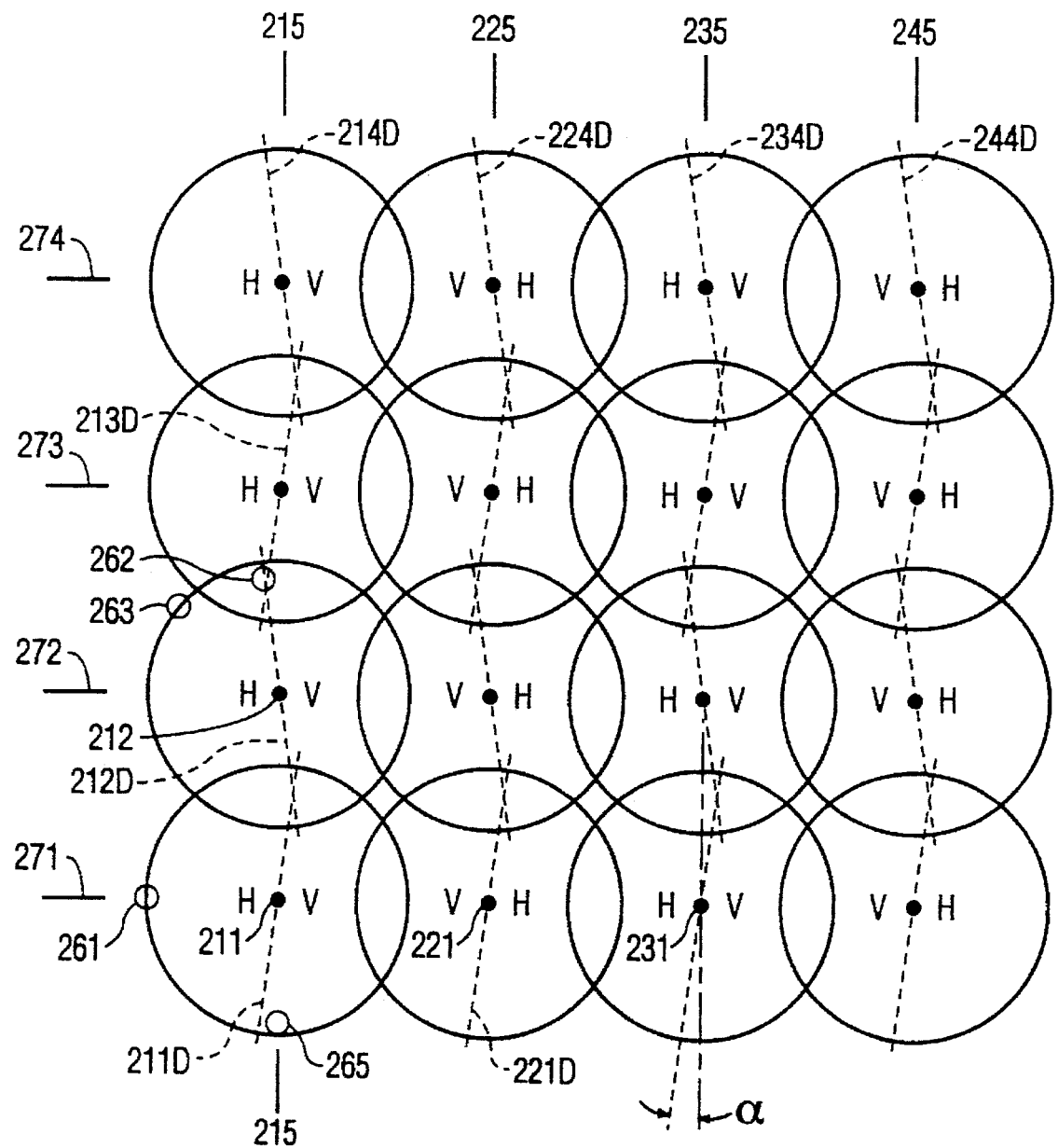
FIG. 3 is a plan view of an LMDS cellular array having a rectangular grid pattern.

Another embodiment, having a rectangular node pattern, is shown in FIG. 3. The nodes are arranged in columns 215, 225, 235, 245 and rows 271–274. Each cell has a node at its center, with a transmitter identical to those of FIG. 1. Unlike the previously described embodiments, the symmetry lines of the sector antennae are not parallel to each other. Rather each of the symmetry lines is inclined so that the division lines 211D–214D, 214D, 221D . . . 244D are inclined with respect to the columns by an angle less than 45°, but the various angle of inclination α are greater, by an amount equal to the receiving antennae beam angles, from a line between the that node and either adjoining node in the column. Where the columns are relatively straight, as shown in FIG. 3, the successive division lines 211D–214D are inclined in alternating directions from the column line; and the successive division lines in a row are inclined in a respective same direction from the respective column lines.

All the transmitters in one column radiate a first polarization to the same one side of the column line, and adjoining cells in a row radiate a same polarization toward each other. Thus cells 211D–214D all radiate vertically polarized signals toward cells 221D–224D.

With this arrangement, a subscriber at a location 261 on a line with nodes 211, 221 and 231 in the same row receives a horizontally polarized signal from desired cell node 211, and a very weak horizontally polarized signal from node 231 which is approximately 3½ cell radii distant; and a weak vertically polarized signal from adjoining node 221. A subscriber at a location near the division line of the cell to be received has its antenna oriented at an angle such that the node of the next cell in the column is outside the antenna's beam or capture angle. Therefore only reflected interfering signals can be received from the next cell in the column. For example, at location 262 a subscriber's antenna can be adjusted for the best polarized signal from node 212 unless there is a strong reflected horizontally polarized signal from node 211. A subscriber at a location in line with its own node and a diagonally adjacent node in the next column, such as location 263, receives an oppositely polarized signal from the diagonal node, compared with its own node.

A subscriber along a column line, as at location 265, receives oppositely polarized signals from its own node 211 and the farther node 212 which is within the antenna's capture angle.

Figure 4:
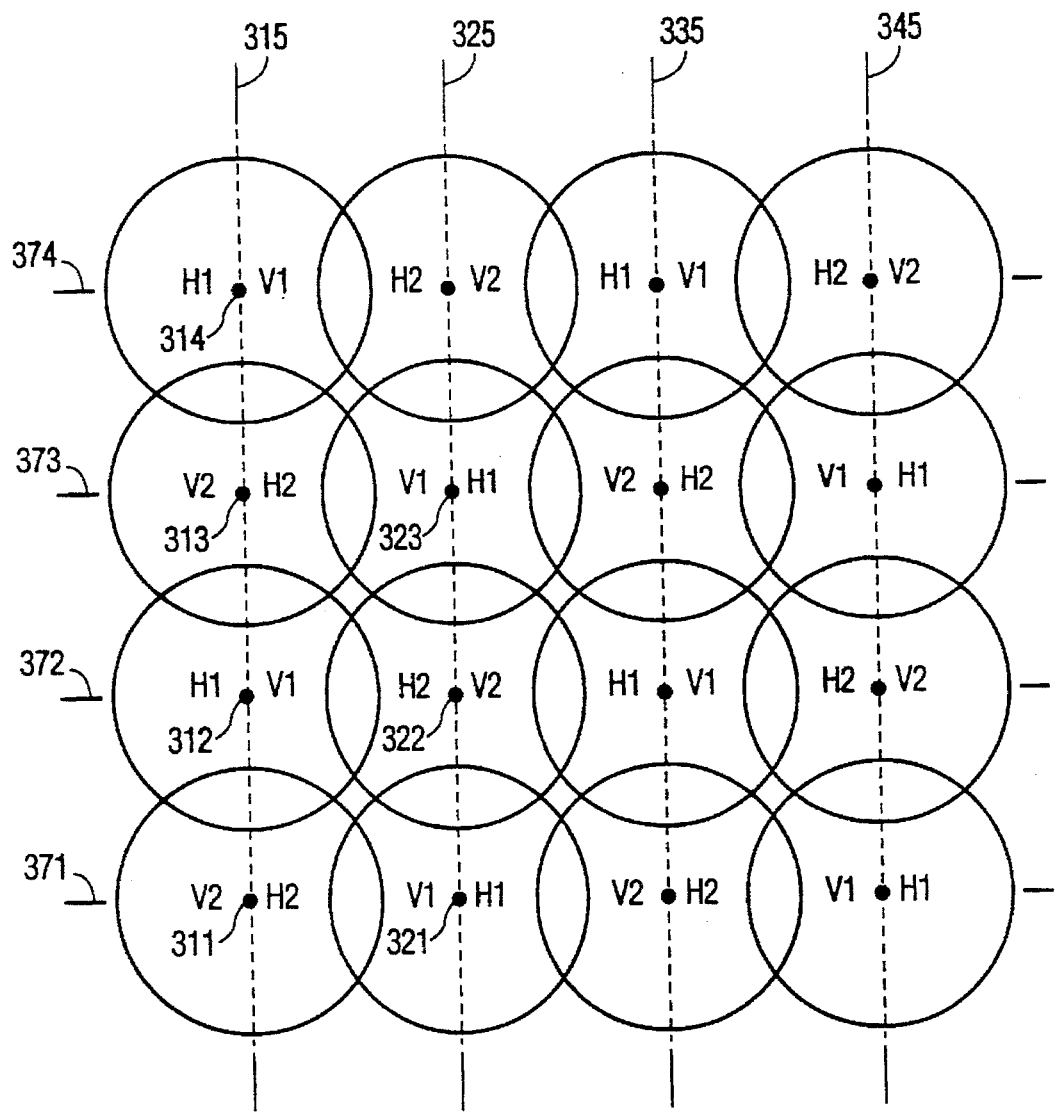
FIG. 4 is a plan view of another LMDS cellular array having a rectangular grid pattern, and interleaved frequency diversity.

Another embodiment, shown in FIG. 4, utilizes both polarization and frequency diversity, and is especially useful for visualizing desirable patterns when the actual arrangement requires significant deviation from neatly ordered rows and columns. As in the embodiment of FIG. 3, the division lines define columns 315, 325, 335 and 345, and the cells are also shown in rows 371–374. Each node transmitter transmits its respective set of frequencies in all directions, and radiates one polarization over one sector, and a different polarization over another sector.

Unlike the other embodiments, adjoining nodes having sectors facing toward each other transmit different polarizations toward each other, and use different frequencies. Cells whose division lines are generally in line form a column of alternating frequencies. Preferably, as in the second embodiment, a 1 Ghz band is divided into 50 upper channels which, including guard bands between adjoining channels, occupy 99% of the band leaving the lowest approximately 9 MHz unused; and is further divided into 50 lower channels which, including guard bands between adjoining channels, occupy 99% of the band leaving the highest approximately 9 MHz unused.

As a result of this arrangement, nodes 311 and 313 transmit using the upper channels, designated as V2 and H2 for the two polarizations, with the horizontal 180° sectors being directed toward nodes 321 and 323 respectively. Nodes 321 and 323 each transmit over the lower channels designated V1 and H1, with the vertical 180° sectors being directed toward nodes 321 and 323 respectively. Nodes 312 and 314 transmit over the same lower channels as nodes 321 and 323, but with the directions of polarization reversed, so that in every case one channel set at one polarization is radiated toward the other channel set having the other polarization. Columns 335 and 345 follow the same pattern, so that along a column successive nodes reverse the direction of the first polarization, and alternate the channel set.

This pattern provides the advantage that, even if the location of a node varies considerably from the exact rectangular pattern shown, any subscriber antenna pointed at a node transmitter having a directly or diagonally adjacent node in the same direction has either a frequency or a polarization difference between the local node transmission and that from the adjacent node.

Figure 5:
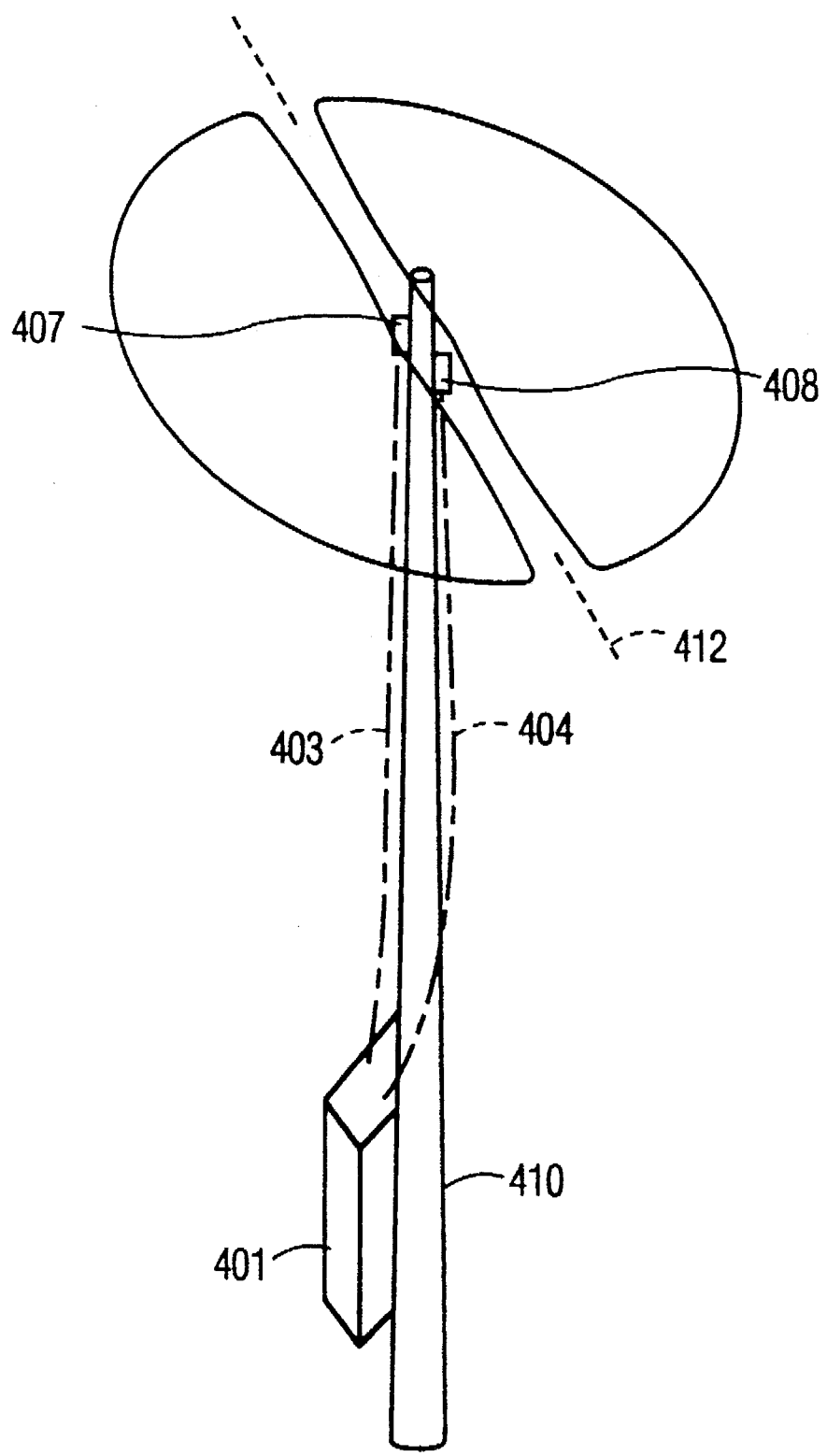
FIG. 5 is a diagrammatic, partially perspective view of a transmitter according to the invention.

FIG. 5 shows a transmitter in accordance with the invention. A modulating and amplifying unit 401 has an output coupled to two polarized waveguides 403, 404 which extend respectively to antennae 407, 408 mounted on a mast or tower 410. Antenna 407 radiates a vertically polarized signal which, in plan view, is substantially uniform for most of a 180° sector, and is down 3 db in directions along a division line 412. Antenna 408 radiates a horizontally polarized signal which, in plan view, is substantially uniform for most of a 180° sector in the opposite direction, and is down 3 db in directions along the division line 412. In a vertical plane, radiated power falls off rapidly above the horizontal, preferably with little power radiated more that 5° above the horizontal; and with radiated power falling off rapidly more than 5° to 10° below the horizontal.

It will be clear to those of ordinary skill in the transmission arts that many variations from these embodiments can be devised, which operate according to the invention. Different polarizations can include circular polarization. Transmission can be divided over two or three or more bands, and can be divided over more than two sector antennae, so long as the two sectors add to a full circle, and transmission in the various directions from a given node is all within one band or set of bands, using a same respective set of frequencies. For operation in the 27 to 30 GHz bands, a single travelling wave tube amplifier can be used to provide the output to both antennae. Other frequency bands can be used, according to government allocation, the relative cost of equipment for different wavelengths, the transmission characteristics in other bands, particularly with respect to rain or other weather effects, and the bandwidth required for different classes of transmitted signal.

Where obstacles, regulations or other causes force design of a system array of cells which is irregular in shape or direction, with cells of differing sizes arranged in an irregular pattern, where possible it may be desirable to incline the radiation division lines with respect to a line to the nearest other node, so that a subscriber whose antenna has two or more transmitting antennae in view will not be located on or near the division line.

What is claimed is:

1. A low power, multi-function cellular television system, comprising a plurality of low power cell node transmitting stations spaced from each other, each transmitting station transmitting signals for reception in an area defining a cell, arranged such that adjoining cells overlap, wherein each transmitting station radiates signals which are uniformly polarized with one polarization over a first sector about a symmetry axis from the transmitting station, and signals which are uniformly polarized with a different polarization over a second sector about said symmetry axis, the signals which are radiated over the first and second sectors of a given station having a same respective plurality of frequencies, the two sectors together providing substantially 360° coverage of the cell, and stations in adjoining cells which are aligned approximately along said axis radiate the signals with said one polarization in a same direction, stations in adjoining cells which are aligned approximately perpendicularly to said axis radiate the signals with said one polarization in opposite directions, the transmitting station in a first of said cells transmits signals comprising a first plurality of individual channels occupying at least 90% of a given band, the transmitting station in a second of said cells adjoining said first cell transmits signals comprising a second plurality of individual channels occupying at least 90% of said given band, and the carrier frequencies of the channels of the transmitting station of said second cell are different from the carrier frequencies of the channels of the transmitting station of said first cell.

2. A system as claimed in claim 1, characterized in that said carrier frequencies of the channels of the transmitting station of said second cell are approximately midway between the carrier frequencies of the channels of the transmitting station of said first cell.

3. A system as claimed in claim 1, characterized in that said one polarization is horizontal, and said different polarization is vertical.

4. A low power, multi-function cellular television system, comprising at least first and second transmitting stations transmitting respective signals for reception in respective primary service areas defining adjoining first and second cells, wherein said first transmitting station radiates signals which comprise a first plurality of individual channels occupying substantially an entire band and which are uniformly polarized over a first sector about a first symmetry axis from the first transmitting station, and signals which comprise said first plurality of channels and which are uniformly polarized about said first symmetry axis over a second sector, the polarization of the second sector being different from the polarization of the first sector, and the first and second sectors together providing substantially omnidirectional coverage of the first cell, and said second transmitting station radiates signals which comprise a second plurality of individual channels occupying substantially the entire band and which are uniformly polarized with one polarization over a third sector about a second symmetry axis from the second transmitting station, and signals which comprise said second plurality of channels and which are uniformly polarized with a polarization different from said one polarization over a fourth sector about said second symmetry axis, the third and fourth sectors together providing substantially omnidirectional coverage of the second cell, and the second plurality of channels have channel frequencies different from those of the first plurality of channels.

5. A system as claim in claim 4, characterized in that said one polarization is horizontal, and said polarization different from said one polarization is vertical.

6. A system as claim in claim 4, characterized in that said first plurality of channels occupies at least 90% of said band, said second plurality of channels occupies at least 90% of said band, and the center frequencies of the channels of the first transmitting station are different from the center frequencies of the channels of the second transmitting station.

7. A system as claimed in claim 4, characterized in that said first plurality of individual channels comprises a plurality of frequency modulated television channels spaced by a carrier frequency separation less than 10% of the bandwidth of each channel, said plurality of frequency modulated television channels being in a band having a bandwidth no greater than approximately 1 GHz, between 27 and 30 GHz, and the center frequencies of the channels of the first transmitting station are approximately midway between the carrier frequencies of the channels of the second transmitting station.

8. A system as claimed in claim 4, characterized in that the sectors of each transmitting station are separated by division lines, alternating transmitting stations aligned approximately in a column have division lines inclined to one side of respective lines connecting adjoining transmitting stations of said column, and the other transmitting stations in said column have division lines inclined to the other side of said respective lines.

9. A low power, multi-function cellular television system for transmitting signals, comprising a plurality of low power cell node transmitting stations arranged at respective nodes spaced from each other, each transmitting station transmitting respective signals for reception in an area defining a respective cell, arranged such that adjoining cells overlap, wherein a first transmitting station radiates signals which comprise a first plurality of individual channels occupying substantially an entire band and which are uniformly polarized over a first sector about a first symmetry axis from the first transmitting station, and signals which comprise said first plurality of channels and which are uniformly polarized about said first symmetry axis over a second sector, the polarization of the second sector being different from the polarization of the first sector, and the first and second sectors together providing substantially omnidirectional coverage of the first cell, and a second transmitting station radiates signals which comprise a second plurality of individual channels occupying substantially the entire band and which are uniformly polarized with one polarization over a third sector about a second symmetry axis from the second transmitting station, and signals which comprise said second plurality of channels and which are uniformly polarized with a polarization different from said one polarization over a fourth sector about said second symmetry axis, the third and fourth sectors together providing substantially omnidirectional coverage of the second cell, a plurality of said nodes are arranged in a line, with the respective symmetry axes of the corresponding transmitting stations being aligned approximately parallel to each other and to said line such that the respective signals radiated from said corresponding transmitting stations toward the respective adjoining corresponding transmitting stations have a same polarization, and the second plurality of channels have channel frequencies different from those of the first plurality of channels.

10. A system as claimed in claim 4, characterized in that said first plurality of individual channels occupy a contiguous portion at one end of said entire band, occupying at least 98% of said entire band, said second plurality of individual channels occupy a contiguous portion at the other end of said entire band, occupying at least 98% of said entire band, and the center frequencies of said first plurality of individual channels are approximately midway between the center frequencies of said second plurality of individual channels.

11. A system as claimed in claim 4, characterized in that said signals comprise a plurality of FM television channels spaced by a carrier frequency separation less than 20% of the bandwidth of each channel, and the center frequencies of the channels of the transmitting station of one of the overlapping cells are approximately midway between the center frequencies of the channels of the transmitting station in the other adjoining cell.

12. A system as claimed in claim 4, characterized in that said first and second sectors are each approximately 180°.

13. A system as claimed in claim 9, characterized in that said first plurality of individual channels occupy at least 90% of said entire band, said second plurality of individual channels occupy at least 90% of said entire band, and the carrier frequencies of the channels of the transmitting station of said second cell are different from the carrier frequencies of the channels of the transmitting station of said first cell.

14. A system as claimed in claim 9, characterized in that a second plurality of said nodes are arranged in a line, with the respective symmetry axes of the corresponding transmitting stations of the second plurality being aligned approximately parallel to each other and to said line such that the respective signals radiated from adjoining transmitting stations toward each other have a same polarization, and said first and second pluralities of said nodes are arranged as a densely packed array.

* * * * *